Oct. 31, 1967  R. L. VAN HUIS  3,349,753
AUTOMATIC WEIGHT OPERATED POULTRY FEEDING DEVICE
Filed Feb. 14, 1966  2 Sheets-Sheet 1

INVENTOR.
ROBERT L. VAN HUIS
BY
ATTORNEYS

Oct. 31, 1967  R. L. VAN HUIS  3,349,753
AUTOMATIC WEIGHT OPERATED POULTRY FEEDING DEVICE
Filed Feb. 14, 1966  2 Sheets-Sheet 2

INVENTOR.
ROBERT L. VAN HUIS
BY
ATTORNEYS

United States Patent Office 3,349,753
Patented Oct. 31, 1967

3,349,753
AUTOMATIC WEIGHT OPERATED POULTRY
FEEDING DEVICE
Robert L. Van Huis, Zeeland, Mich., assignor to Big Dutchman, Inc., Zeeland, Mich., a corporation of Michigan
Filed Feb. 14, 1966, Ser. No. 527,180
3 Claims. (Cl. 119—52)

This invention relates to automated poultry feeding apparatus, and more particularly to a novel feed supply control switch apparatus for automatic fowl feeding equipment employing pan type feeders.

Automated poultry feeding apparatus has as one major advantage the facility for feeding great numbers of birds without significant operator time or attention. The quantity of feed dispersed in the system is normally controlled by some sort of feed operated switch means on the far end of the system, to start up and shut off the electrical drive motor for the feed supply. A common switch arrangement is that of a mercury switch mounted on a pivotal flat or the equivalent to thereby shift when a certain predetermined amount of feed is introduced into the system. While these frequently provide satisfactory operation, dependability over a substantial time period has been a definite concern. It will be realized that even relatively infrequent failure of the switch to shut off the supply motor can cause extensive waste of feed and damage to the equipment by the time an operator discovers and corrects the faulty apparatus.

It is an object of this invention to provide a novel and more reliable, yet sensitive feed control switch apparatus for automated poultry feeding equipment.

Another object of this invention is to provide an automated poultry feeder control switch assembly uniquely combined with one pan of a pan type feeding system to effect a reliable, variable, relatively simple apparatus which is not dependent upon mercury switches or the like and is especially suited to pan type feeders.

These and other objects of this invention will become apparent upon studying the following specification in conjunction with the drawings in which.

Figure 1:
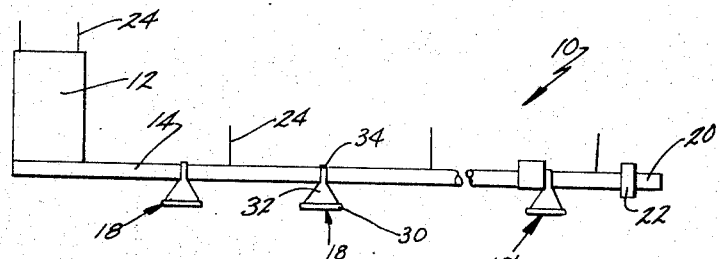
FIG. 1 is an elevational view of an automated poultry feeder system using this invention.

Referring now specifically to FIG. 1 of the drawings, the complete feeder line 10 there illustrated may be of any selected length from 10' up to several hundred feet. It includes a supply hopper 12, an elongated tube 14 containing an inner feed auger 16 (FIG. 4) and having mounted thereon a plurality of spaced feeder pan assemblies 18. Mounted on one end of the tube is an electrical motor drive unit which normally includes an electrical motor 20 and a speed reducing assembly 22 such as a gear box, a belt assembly or the like, making a drive connection from motor 20 to auger 16.

This entire assembly is preferably supported from overhead means by suitable suspension elements 24 on the hopper and the tubular feed line. The assembly 10 may be used by itself, or in combination with a plurality of like assemblies supplied from a common overhead supply system (not shown). The number of pan assemblies 18 will normally vary with the length of the assembly, with just a few being shown in FIG. 1 for purposes of convenience. Each pan assembly 18 includes a lower feed receiving pan 30, a generally conically shaped pan support and tubular feed container and drop 32, and a collar 34 which mounts the cone 32 to tube 14. The tube includes a drop opening 35 (FIG. 4) to each pan assembly.

Figure 2:
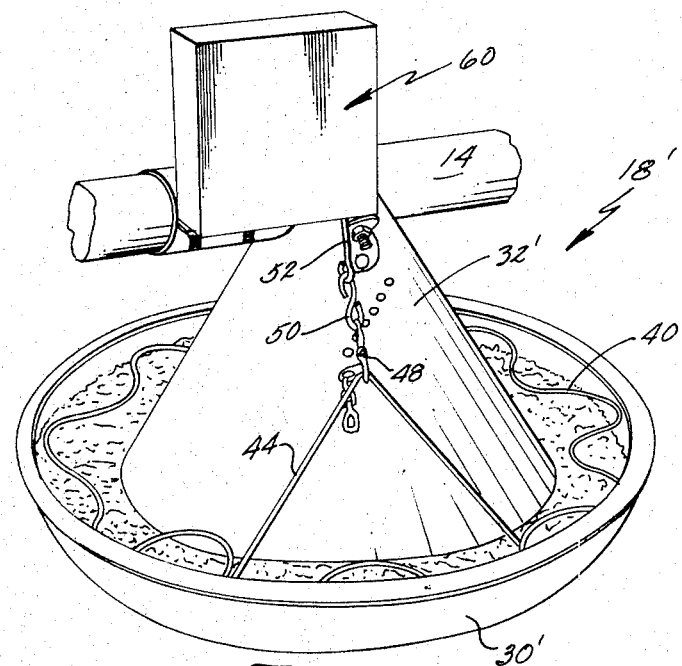
FIG. 2 is an enlarged fragmentary perspective view of the control pan and switch assembly of this invention.
Figure 3:
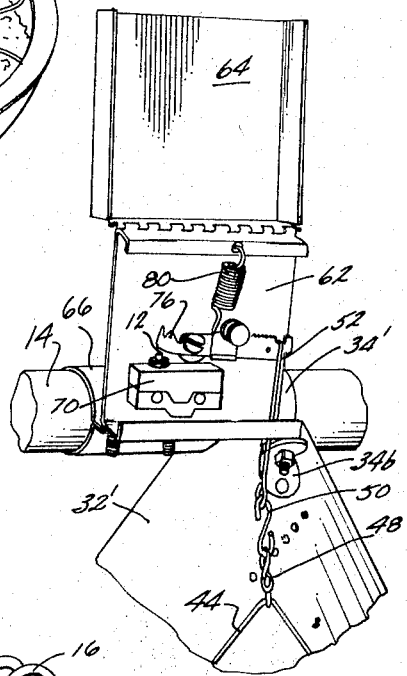
FIG. 3 is an enlarged fragmentary perspective view of a portion of the apparatus in FIG. 2.
Figure 4:
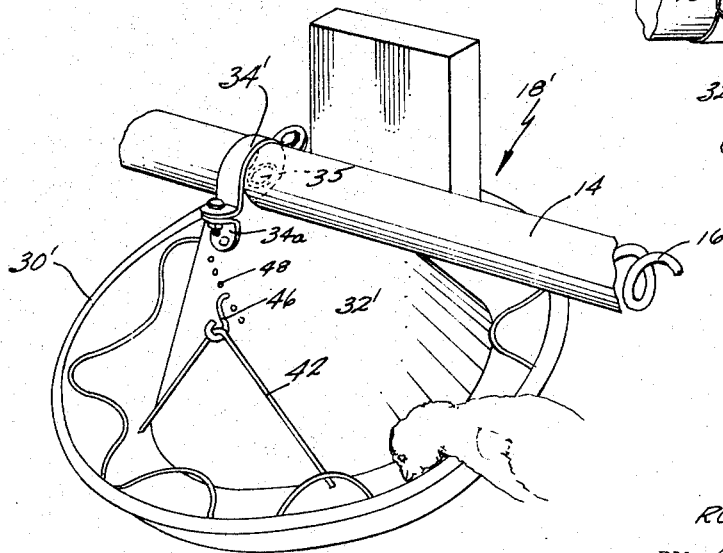
FIG. 4 is a perspective fragmentary view of the apparatus in FIG. 2, taken from the opposite side.

Mounted as the last pan assembly on the downstream end of tube 14 is the control pan assembly 18'. As shown in FIGS. 2 through 4, this control pan assembly 18' also includes a lower feed receiving pan 30', a hollow generally conically shaped member 32' and a collar support 34' which as shown, includes an upper semi-circular collar member, and a pair of lower flange members 34a and 34b riveted or otherwise suitably secured to cone 32', for fixed attachment of the cone to tube 14. The cone and pan form an annular outer feed access area for the poultry. This preferably is divided into areas by a generally sinusoidal shaped peripheral wire 40.

Attached to pan 30' is a pair of V-shaped bails 42 and 44. These inverted V-shaped members have their lower ends attached to the pan, with the bite portions extending upwardly. The bite of bail 42 is attached by a wire clip 46 to cone 32' by use of one of several openings 48 in cone 32'. The opposite bail 44 has its bite attached by suspension means such as adjustable chain 48 and wire clip 50, to a tension link 52 of the control switch subassembly 60 which is in combination with the control pan subassembly 18'.

Figure 5:
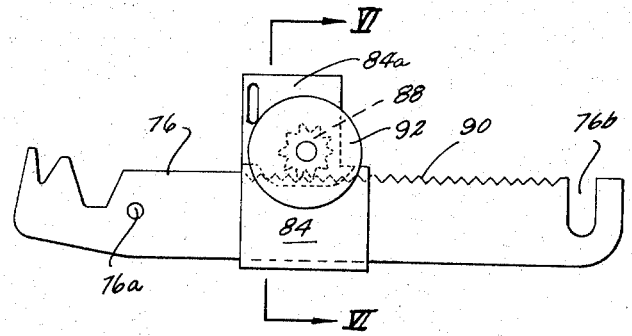
FIG. 5 is an enlarged side elevational view of the portion of the apparatus in FIG. 3.
Figure 6:
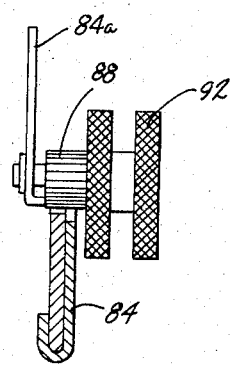
FIG. 6 is a fragmentary enlarged sectional view taken on the plane VI—VI in FIG. 5.

Control switch subassembly 60 includes a support 62 and preferably a housing cover 64 pivotally attached thereto. Support 62 is mounted to tube 14 as by collar 66, adjacent pan supporting collar 34'. Mounted inside the enclosure housing formed by support 62 and cover 64 is a microswitch 70 having a shiftable switch actuator 72 such that when actuator 72 is depressed, the electrical drive motor is actuated due to an electrical connection thereto, and when switch actuator 72 is released, electrical motor 20 is deactivated or shut off. Adjacent switch actuator 72 is one end of a lever arm 76 which is pivotally mounted intermediate its ends on pivot point 76a to support 62 (FIG. 5). At the opposite end of lever 76 is a groove 76b to receive the upper curled end of tension link 52.

It will be noted that weight of feed in pan 30' will tend to pull bail 44 downwardly, to thereby pull link 52 downwardly, to pivot lever arm 76 clockwise around its pivot axis (as viewed in FIG. 3) to shift lever arm away from the switch actuator 72 for releasing the actuator. This movement is opposed by the biasing force of a tension coil spring 80 extending between the upper end of support plate 62, and a hooked connection to a flange 84a of a collar 84 which curls around the under edge of arm 76. The amount of biasing force applied by spring 82 to lever 76 can be varied by changing the position of the lower end of spring with respect to the pivot point 76a, by shifting the position of collar 84 along the length of lever arm 76. Adjustment is made through a spur gear 88 rotationally mounted to flange 84a, and intermeshed with gear rack teeth or notches 90 along the upper edge of arm 76. Gear 88 may be rotated by knurled knobs 92 to advance collar 84 in either direction along the arm 76.

In operation, the occurrence of feed depletion in the end control pan 18' is normally accompanied by the depletion of feed in the other pan assemblies. When the feed weight in the control pan drops below the biasing force of the tension spring 80, the spring rotates lever arm 76 counter-clockwise (as viewed in FIG. 3) about its pivot point 76a, thereby lifting link 52, clip 50 and chain 48 as well as bail 44 and pan 30' so that one end of lever arm 76 depresses switch actuator 72 to close the electrical switch 70 that is in the electrical circuit with drive motor 20. Motor 20 is thus actuated to drive the gear reduction means 22 and rotate auger 16 in tube 14. The auger then advances feed from hopper 12 to the pans, with this feed dropping down through openings 35 and through hollow cones 32 and 32' and into the several pans 30 and control pan 30'. The feed fills the pans and conical elements to a desired weight which is regulated by adjustment of knob 92 along lever to adjust position of collar 84 and thus one end of spring 80 along the lever arm 76. When sufficient weight of feed has been entered into pan assembly 18' to cause the weight bias to overcome the bias of spring 80, lever arm 76 is pivoted clockwise sufficiently to release switch actuator 72 and thus deactuate electrical switch 70 and shut off the electrical drive motor 20.

The apparatus therefore effectively employs the support means for the pan itself as a controlling feature for the weight control feed advancing and filling means. Under extensive experimentation, the apparatus has proven to be reliable, dependable, and effective. Various additional advantages to those specifically recited may occur to those in the art upon studying the foregoing disclosure. It is also conceivable that certain minor deviations of construction may be employed on the preferred construction shown, without departing from the novel concept presented. Hence, the invention is intended to be limited only by the scope of the appended claims and the reasonably equivalent structures to those defined therein.

I claim:

1. Automated fowl feeding apparatus including (1) an orificed feed supply conduit, (2) feed advancing means in the conduit, (3) a plurality of feed receiving pan assemblies beneath the conduit, and (4) electrical power means for said feed advancing means, the improvement comprising: one of said pan assemblies comprising feed supply control means, and including a hollow support element mounted to said tube, and a feed pan beneath said element and having hangers thereon; one of said hangers being attached to said element; a control switch subassembly mounted adjacent said tube and one pan assembly, operably associated with said electrical power means to control it, and including a control switch lever means and means biasing said lever means to an actuating position; another of said hangers operably linked to said lever means and arranged to cause feed in said pan to apply a gravity biasing force to said lever means in opposed relation to that of said biasing means, to shift said lever means to an inactive position upon said pan receiving a predetermined amount of feed therein.

2. The apparatus in claim 1 wherein said hangers comprise wire bails of inverted V-shaped configuration on opposite sides of said pan, with the lower ends of the V attached to said pan.

3. The apparatus in claim 2 wherein said lever means is pivotally mounted on a pivot axis, one of said support bails is connected by a link to said lever means at a first point spaced from said pivot axis, said biasing means is a spring attached to said lever means at a second point spaced from said pivot axis, and said lever means includes adjustment means allowing adjustment of said first and second points with respect to each other, to thereby enable pre-setting of the feed weight in said control pan assembly necessary to operate said control switch subassembly.

References Cited
UNITED STATES PATENTS

| | | | |
|---|---|---|---|
| 2,681,639 | 6/1954 | Littlefield | 119—52 |
| 2,800,106 | 7/1957 | Nelson | 119—52 |
| 3,033,163 | 5/1962 | Hostetler et al. | 119—52 |
| 3,085,552 | 4/1963 | Pilch | 119—57 |
| 3,230,933 | 1/1966 | Myers et al. | 119—53 |
| 3,302,617 | 2/1967 | Bares | 119—52 |

ALDRICH F. MEDBERY, *Primary Examiner.*